US012741316B2

(12) United States Patent
Chen et al.

(10) Patent No.: US 12,741,316 B2
(45) Date of Patent: Sep. 22, 2026

(54) METHOD OF CONTROLLING AN IRRADIATION SYSTEM, IRRADIATION SYSTEM, COMPUTER PROGRAM PRODUCT AND APPARATUS FOR PRODUCING A THREE-DIMENSIONAL WORK PIECE

(71) Applicant: NIKON SLM SOLUTIONS AG, Luebeck (DE)

(72) Inventors: Jiachun Chen, Luebeck (DE); Andreas Hoppe, Luebeck (DE); Dieter Schwarze, Luebeck (DE)

(73) Assignee: NIKON SLM SOLUTIONS AG, Luebeck (DE)

( * ) Notice: Subject to any disclaimer, the term of this patent is extended or adjusted under 35 U.S.C. 154(b) by 310 days.

(21) Appl. No.: 18/287,092

(22) PCT Filed: Apr. 13, 2022

(86) PCT No.: PCT/EP2022/059831
§ 371 (c)(1),
(2) Date: Oct. 16, 2023

(87) PCT Pub. No.: WO2022/223381
PCT Pub. Date: Oct. 27, 2022

(65) Prior Publication Data

US 2024/0198424 A1 Jun. 20, 2024

(30) Foreign Application Priority Data

Apr. 19, 2021 (DE) ..................... 10 2021 109 831.9

(51) Int. Cl.
*B22F 10/366* (2021.01)
*B22F 12/49* (2021.01)
(Continued)

(52) U.S. Cl.
CPC ............ *B22F 10/366* (2021.01); *B22F 12/49* (2021.01); *B33Y 30/00* (2014.12); *B33Y 50/02* (2014.12)

(58) Field of Classification Search
CPC ............ B29C 65/1661; B29C 65/1658; B29C 65/1654; B29C 65/1454; B29C 64/10;
(Continued)

(56) References Cited

U.S. PATENT DOCUMENTS

2015/0158111 A1* 6/2015 Schwarze ............... B22F 12/13 219/121.61
2015/0174827 A1* 6/2015 Schwarze ............. B29C 64/393 700/120
2019/0077086 A1* 3/2019 Stengel ...................... G06T 7/73

FOREIGN PATENT DOCUMENTS

CN 105102160 A 11/2015
CN 106424723 A 2/2017
(Continued)

OTHER PUBLICATIONS

European Patent Office, International Search Report and Written Opinion for International Patent Application No. PCTtEP2022059B31, Jun. 24, 2022.
(Continued)

*Primary Examiner* — Stella K Yi
(74) *Attorney, Agent, or Firm* — Williams Mullen; Thomas F. Bergert

(57) ABSTRACT

A method of controlling an irradiation system (10) for irradiating layers of a raw material powder with a radiation beam (14) in order to produce a three-dimensional work piece (110) is described. The method comprises the steps of defining, for at least one raw material powder layer to be irradiated, a scanning pattern comprising a plurality of irradiation sections (20), wherein, within each of the plurality of irradiation sections (20), a plurality of scanning
(Continued)

vectors (V) is defined, according to which the radiation beam (14) is scanned across the raw material powder layer; determining, for each of the plurality of irradiation sections (20), whether the irradiation section (20) contains a downskin area (22); and defining, for each of the plurality of irradiation sections (20), a scanning order direction (S) according to which the scanning vectors (V) within the irradiation section (20) are scanned one after another in dependence on the determination of whether the irradiation section (20) contains a downskin area (22).

8 Claims, 7 Drawing Sheets

(51) Int. Cl.
*B33Y 30/00* (2015.01)
*B33Y 50/02* (2015.01)

(58) Field of Classification Search
CPC ................ B29C 64/264; B29C 64/129; B29C 2045/0075; B29C 64/171; B29C 64/165; B29C 64/153; B29C 64/135
See application file for complete search history.

(56) References Cited

FOREIGN PATENT DOCUMENTS

| | | | |
|---|---|---|---|
| DE | 102013205724 | | 10/2014 |
| DE | 102017126624 | * | 5/2019 |
| EP | 2786858 | | 10/2014 |
| JP | 199408343 | | 1/1994 |
| JP | 2020518721 | | 11/2018 |

OTHER PUBLICATIONS

German Patent and Trademark Office, German Search Report for International Patent Application No. 10 2021 109 831.9, Mar. 17, 2022.
S. Clijsters et al.; "Development of a Smart Selective Laser Melting Process", Dissertation, Mar. 1, 2017.
B. Lane et al.; "Multiple Sensor Detection of Process Phenomena in Laser Powder Bed Fusion", NIST, vol. 9861, pp. 986104-986104, May 11, 2016.
Shi et al., "Experiment of Process Strategy of Selective Laser Melting Forming Metal Nonhorizontal Overhanging Structure", vol. 9 No. 4 p. 385, Mar. 27, 2019.
Cloots et al.; "Assessing new support minimizing strategies for the additive manufacturing technology SLM", Structural and Multidisciplinary Optimization, METALS, pp. 631-643, Jan. 1, 2013.
Japan Patent Office, Office Action, Japanese Patent Application No. 2024-507061, Apr. 8, 2025.
Japanese Patent Office, Japanese Examination Report, International Patent Application No. JP 2024-507061, Dec. 6, 2024.
China National Intellectual Property Administration, Office Action, China Patent Application No. 202280037656.3, Nov. 27, 2025.
China National Intellectual Property Administration, Office Action, Chinese Patent Application No. 202280037656.3, Apr. 21, 2026.
Japan Patent Office, Office Action, Japanese Patent Application No. 2024-507061, Jun. 9, 2026.

* cited by examiner

METHOD OF CONTROLLING AN IRRADIATION SYSTEM, IRRADIATION SYSTEM, COMPUTER PROGRAM PRODUCT AND APPARATUS FOR PRODUCING A THREE-DIMENSIONAL WORK PIECE

CROSS-REFERENCE TO RELATED APPLICATIONS

This application is the U.S. national phase application of international patent application PCT/EP2022/059831 and claims the benefit of German patent application No. 10 2021 109 831.9 filed on Apr. 19, 2021, the entire disclosures of which are incorporated herein by way of reference.

The invention is directed to a method of controlling an irradiation system for irradiating layers of a raw material powder with a radiation beam in order to produce a three-dimensional work piece. Further, the invention is directed to an irradiation system of this kind and a computer program product comprising program portions for performing the method of controlling an irradiation system when the computer program product is executed on one or more computing devices. Finally, the invention is directed to an apparatus for producing a three-dimensional work piece.

In additive manufacturing methods, work pieces are produced layer-by-layer by generating a sequence of solidified and interconnected work piece layers. These processes may be distinguished by the type of raw material and/or the way of solidifying said raw material in order to produce the work piece.

For example, powder bed fusion is an additive manufacturing process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production or repairing of prototypes, tools, replacement parts, high value components or medical prostheses, such as, for example, dental or orthopaedic prostheses, on the basis of CAD data.

In an exemplary method and apparatus for producing three-dimensional work pieces by powder bed fusion as described in EP 2 786 858 B1, a process chamber is supplied with a protective gas stream which is directed through the process chamber for establishing a desired atmosphere within the process chamber and for discharging impurities from the process chamber. An operation of an irradiation device is controlled such that a radiation beam emitted by at least one radiation source of the irradiation device is guided over a layer of raw material powder according to a radiation pattern comprising a plurality of scanning vectors. The scanning vectors are oriented in dependence on a direction of flow of the gas stream flowing through the process chamber.

Starting points of scanning vectors are prone to the formation of pores or defects. Such pores or defects may affect the quality of the produced work pieces, in particular when the pores or defects are arranged in an overhang area, also called downskin area. As overhang area is understood an area of a work piece layer produced by irradiating a powder layer which lies above unsolidified powder instead of above a previously solidified work piece layer.

It is an object of the present invention to provide a method of controlling an irradiation system for irradiating layers of a raw material powder with a radiation beam in order to produce a three-dimensional work piece, an irradiation system of this kind and a computer program product which allow the production of high-quality work pieces. Further, the invention is directed to an apparatus for producing a three-dimensional work piece which allows the production of high-quality work pieces.

The invention is set out in the independent claims. Preferred embodiments of the invention are outlined in the dependent claims.

A method of controlling an irradiation system for irradiating layers of a raw material powder with a radiation beam in order to produce a three-dimensional work piece is described. In the method, for at least one raw material powder layer to be irradiated, a scanning pattern comprising a plurality of irradiation sections is defined. Within each of the plurality of irradiation sections, a plurality of scanning vectors is defined, according to which the radiation beam is scanned across a raw material powder layer. The radiation beam may be a beam of electromagnetic or particle radiation which is guided across the raw material powder layers in a site selective manner in accordance with a geometry of corresponding layers of the work piece to be produced.

The irradiation system may comprise a radiation beam source, in particular a laser beam source, wherein the laser beam source may be configured to emit a continuous laser beam, a modulated laser beam or a pulsed laser beam. Additionally, the irradiation system may comprise at least one optical unit for splitting, guiding and/or processing at least one radiation beam emitted by the radiation beam source. The optical unit may comprise optical elements such as an object lens and a scanner unit, the scanner unit preferably comprising a diffractive optical element and a deflection mirror. The irradiation system may irradiate the raw material powder layers with a single radiation beam. It is, however, also conceivable that the irradiation system irradiates two or more radiation beams onto the raw material powder layers.

The raw material powder layers may be applied onto a surface of a carrier by means of a powder application device which is moved across the carrier so as to distribute the raw material powder. The carrier may be a rigidly fixed carrier. Preferably, however, the carrier is designed to be displaceable in vertical direction, so that, with increasing construction height of the work piece, as it is built up in layers from the raw material powder, the carrier can be moved downwards in the vertical direction. The carrier and the powder application device may be accommodated within a process chamber which is sealable against the ambient atmosphere. A protective gas stream may be directed through the process chamber for establishing a desired atmosphere within the process chamber and for discharging impurities from the process chamber. The raw material powder applied onto the carrier within the process chamber is preferably a metallic powder, in particular a metal alloy powder, but may also be a ceramic powder or a powder containing different materials. The powder may have any suitable particle size or particle size distribution. It is, however, preferable to process powders of particle sizes <100 μm.

The scanning pattern may be a stripe pattern, wherein each irradiation section defines a stripe of the stripe pattern.

It is, however, also conceivable that the scanning pattern is a chess pattern or any other suitable scanning pattern which comprises a plurality of irradiation sections, wherein blocks of scanning vectors are arranged. The irradiation sections may be arranged adjacent to each other or may overlap each other. The scanning vectors within a irradiation section typically, but not necessarily, extend substantially parallel to each other. Within an irradiation section, the scanning vectors may be unidirectional, i.e. within an irradiation section, all scanning vectors may point in the same direction. It is, however, also conceivable, that, within an irradiation section, adjacent scanning vectors point in opposite directions. In case the scanning pattern is a stripe pattern, the scanning vectors within a stripe may extend substantially perpendicular to a longitudinal axis of the stripe. However, also other orientations of the scanning vectors relative to the longitudinal axis of the stripe are conceivable.

In a preferred embodiment, it may be determined for at least a part of the plurality of irradiation sections, preferably for each of the plurality of irradiation sections, whether the irradiation section contains a downskin area. As “downskin area” is understood an area of an irradiation section which lies above unsolidified powder instead of above a previously solidified work piece layer area. Thus, in a downskin area, at least one scanning vector extends over at least a part of its length across unsolidified, loose powder. A downskin area is intended to form an overhang area of the work piece layer to be produced.

For each of the plurality of irradiation sections, a scanning order direction according to which the scanning vectors within the irradiation section are scanned one after another may be defined in dependence on the determination of whether the irradiation section contains a downskin area. The scanning order direction might extend substantially perpendicular to the scanning vectors within the irradiation section. For example, in case the scanning pattern is a stripe pattern with scanning vectors arranged substantially parallel to each other and substantially perpendicular to longitudinal axes of the stripes, the scanning order direction may extend substantially perpendicular to the scanning vectors and thus substantially parallel to the longitudinal axes of the stripes. The above defined method steps may be performed for at least one and preferably for each work piece layer to be produced.

In an alternative embodiment, areas of the work piece containing an overhang or downskin area or in which there is a part growth direction could first be determined. Then the position of the irradiation sections can be compared with the result of said determination.

In the herein described method, the presence of a downskin area in an irradiation section is considered upon defining the scanning order direction. This allows to address quality issues, for example the formation of pores or warping, that might arise upon forming overhang regions of a work piece. Considering the presence of a downskin area in an irradiation section upon defining the scanning order direction for said irradiation section is in particular advantageous in the manufacturing of work pieces comprising overhangs and specifically low angled overhangs such as overhangs with an overhang angle of <40°, <30° or <20° in relation to a horizontal plane, in particular in case the overhangs should be formed without being supported by a support structure.

The scanning order direction may be defined in dependence on the determination of whether the irradiation section contains a downskin area already in advance, i.e. upon setting the layers of the work piece to be produced (slicing) and the scanning pattern (hatching). This may, for example, be achieved by using a suitable simulation and/or slicing/hatching tool. It is, however, also conceivable to define a preliminary scanning order direction without considering the presence of downskin areas in the irradiation sections of the work piece layers to be produced and to then redefine, i.e. redirect the scanning order direction if needed.

For at least one irradiation section which contains a downskin area, the scanning order direction is defined so as to point from an on-solid area in a direction of the downskin area. This particularly may be applied to all irradiation sections containing a downskin area. For an irradiation section which contains both a downskin area and an on-solid area, a vector defining the scanning order direction may comprise a starting point which is located in the on-solid area and an endpoint which is located in the downskin area. In case the irradiation section consists of a downskin area, i.e. does not contain an on-solid area, a starting point of the vector defining the scanning order direction may be arranged closer to the on-solid area than the endpoint of said vector.

In any case, a scanning order direction which is defined so as to point from an on-solid area in a direction of a downskin area ensures that the irradiation of the downskin area starts as close as possible to the on-solid area instead of on loose powder. Consequently, each scanning vector within the downskin area is irradiated immediately adjacent or at least close to a previously irradiated scanning vector and hence immediately adjacent or at least close to a previously solidified area of the irradiation section. Thus, a connection between a work piece layer area built in an on-solid area and a work piece layer area built in a downskin area as well as the overall quality of the work piece layer area built in the downskin area can be improved.

For an irradiation section which does not contain a downskin area, i.e. which consists of an on-solid area, the scanning order direction may be defined so as to point from the on-solid area in a direction of a downskin area of a further, for example adjacent, irradiation section. It is, however, also conceivable that for an irradiation section which does not contain a downskin area, the scanning order direction is defined in dependence on a direction of flow of a gas stream directed across the raw material powder layer. Specifically, the scanning order direction may be defined so as to comprise a component which is oriented opposite to the direction of flow of the gas stream directed across the raw material powder layer. As a consequence, disturbing effects of particulate impurities which may absorb radiation energy and/or shield the radiation beam in a process zone, where the radiation beam impinges on the raw material powder can reduced or avoided.

For an irradiation section which contains a downskin area, the scanning order direction may be defined such that an angle between the scanning order direction and a part growth direction is 90°. In the context of this application, the term “part growth direction” defines a direction in which the component boundaries are shifted between two layers. This could be defined for a complete work piece layer, i.e. the part growth direction then corresponds to the direction of the shift of the center of gravity, or for areas/boundaries of the work piece. In this case there could be more than one part growth direction. For example, the part growth direction may extend substantially perpendicular to a border between an on-solid area and a downskin area of an irradiation section. An angle between the scanning order direction and the part growth direction which is 90° ensures that a vector defining the scanning order direction has a component which extends in the same direction as the part growth direction and that consequently the scanning order direction points from the on-solid area in the direction of the downskin area.

The setting of the scanning order such that an angle between the scanning order direction and the part growth direction is 90° may be performed in advance, i.e. upon a slicing and hatching procedure. It is, however, also conceivable to define a preliminary scanning order direction in a first step, to review whether there are irradiation sections containing a downskin area for which an angle between the preliminary scanning order direction and the part growth direction is >90° in a second step, and to finally redirect the scanning order direction so as to satisfy the criteria that an angle between the scanning order direction and the part growth direction is 90°.

Alternatively or additionally thereto, the method may comprise the step of determining, for a first edge scanning vector within a downskin area of an irradiation section, a number of endpoints of the first edge scanning vector which are in contact with an on-solid area or lie on an on-solid area. Further, for a second edge scanning vector within the downskin area, a number of endpoints of the second edge scanning vector which are in contact with an on-solid area or lie on an on-solid area may be determined. In the context of this application, the term "edge scanning vector" defines a scanning vector which lies at an edge of a downskin area of an irradiation section, i.e. adjacent to a border of the downskin area.

The scanning order direction may be defined such that the one of the first or the second edge scanning vector which has more endpoints in contact with the on-solid area or lying on the on-solid area is defined as a starting scanning vector and/or such that the one of the first and the second edge scanning vector which has less endpoints in contact with the on-solid area or lying on the on-solid area is defined as a final scanning vector.

If it is determined, for a first and a second edge scanning vector within a downskin area of an irradiation section, that none of the first and the second edge scanning vector has an endpoint in contact with an on-solid area, i.e. that each of the first and the second edge scanning vector starts and ends within the downskin area, the method may further comprise a step of determining, for the first edge scanning vector, a number of on-solid scanning vector points in a vicinity of the endpoints of the first edge scanning vector. Further, for the second edge scanning vector, a number of on-solid scanning vector points in a vicinity of the endpoints of the second edge scanning vector may be determined. In the context of this application, the term "on-solid scanning vector point" defines a point on a vector which lies within an on-solid area of, for example, an adjacent irradiation section.

The scanning order direction may be defined such that the one of the first and the second edge scanning vector which has more on-solid scanning vector points in the vicinity of its endpoints is defined as a starting scanning vector and/or such that the one of the first and the second edge scanning vector which has less on-solid scanning vector points in the vicinity of its endpoints is defined as a final scanning vector. For example, an area having a specific radius of, for example, 0.25 mm may be defined around the endpoints of the first and the second edge scanning vectors and it may be determined how many on-solid scanning vector points are arranged in said area. It is, however, of course also conceivable to define non-circular areas of any suitable shape, but of a suitable size around the endpoints of the first of the second edge scanning vectors and to analyze the number of on-solid scanning vector points within these areas.

The setting of the scanning order in dependence on the number of endpoints of the first and the second edge scanning vectors in contact with the on-solid area and/or in dependence on the number of on-solid scanning vector points in the vicinity of the endpoints of the first and the second edge scanning vectors may be performed in advance, i.e. upon a slicing and hatching procedure. It is, however, also conceivable to define a preliminary scanning order direction in a first step, to review whether there are irradiation sections containing a downskin area for which the above described number of endpoints criteria and/or the above described number of on-solid scanning vector points criteria are not fulfilled, and to finally redirect the scanning order direction so as to satisfy said criteria.

The definition of the scanning order direction in dependence on the number of endpoints of the first and the second edge scanning vectors in contact with the on-solid area and/or in dependence on the number of on-solid scanning vector points in the vicinity of the endpoints of the first and the second edge scanning vectors is particularly suitable for irradiation sections which consist only of a downskin area, i.e. which do not comprise an on-solid area. It is, however, also conceivable to use these criteria for setting the scanning order direction for irradiation sections which comprise a downskin area and an on-solid area.

A downskin area may also involve several downskin vector blocks. Each downskin vector block may contain one starting vector and one ending vector and a scanning order direction. For example, a downskin area may have several downskin stripes, wherein each stripe defines a downskin vector block, containing a starting vector and an end vector. The scanning order direction may be determined for each downskin vector block. Scanning may be performed by using an order from block to block (solid-to-powder direction) and with scanning order directions for each block which are determined as described above.

If it is determined, for a first and a second edge scanning vector within a downskin area of an irradiation section which also comprises an on-solid area, that none of the first and the second edge scanning vector has an endpoint in contact with the on-solid area the irradiation section may be divided in the on-solid area into a first partial irradiation section and a second partial irradiation section. Thus, each of the first and the second partial irradiation section comprises an on-solid area defined by a part of the on-solid area of the undivided irradiation section and a downskin area defined by a part of the downskin area of the undivided irradiation section.

For the first partial irradiation section, a first scanning order direction which points from the on-solid area of the first partial irradiation section in a direction of the downskin area of the first partial irradiation section may be defined. For the second partial irradiation section, a second scanning order direction which points from the on-solid area of the second partial irradiation section in a direction of the downskin area of the second partial irradiation section may be defined. The first scanning order direction and the second scanning order direction may point in opposite directions.

The scanning vectors may be unidirectionally oriented so as to point from an on-solid area in a direction of the downskin area. Thus, not only the scanning order direction on an irradiation section level, but also the orientation of the scanning vectors may be defined so as to follow the rule "from solid to powder" in order to further improve the quality of overhanging work piece regions.

Further, it is also conceivable that, for at least one raw material powder layer to be irradiated, an irradiation order direction according to which the irradiation sections within the raw material powder layer are irradiated one after another is defined so as to point from a first irradiation section in a direction of a second irradiation section, wherein the second irradiation section has a downskin area coverage that is larger than a downskin area coverage of the first irradiation section. In the context of this application the expression "downskin area coverage" designates a percentage of an irradiation section which is covered by a downskin area. In this embodiment of the method, also the irradiation order direction according to which the irradiation sections are irradiated one after another is defined so as to follow the rule "from solid to powder" in order to still further improve the quality of overhanging work piece regions.

An irradiation system for irradiating layers of a raw material powder with a radiation beam in order to produce a three-dimensional work piece comprises a control unit. The control unit may exclusively be associated with the irradiation system. It is, however, also conceivable that the control unit forms a part of an overall control system for controlling the operation of an apparatus for producing a three-dimensional work piece which is equipped with the irradiation system. The control unit is configured to define, for at least one raw material powder layer to be irradiated, a scanning pattern comprising a plurality of irradiation sections, wherein, within each of the plurality of irradiation sections, a plurality of scanning vectors is defined, according to which the radiation beam is scanned across the raw material powder layer.

Further, the control unit may be configured to determine, for at least a part of the plurality of irradiation sections, preferably for each of the plurality of irradiation sections, whether the irradiation section contains a downskin area and to define, for each of the plurality of irradiation sections, a scanning order direction according to which the scanning vectors within the irradiation section are scanned one after another in dependence on the determination of whether the irradiation section contains a downskin area.

For an irradiation section which contains a downskin area, the control unit is configured to define the scanning order direction so as to point from an on-solid area in a direction of the downskin area.

For an irradiation section which does not contain a downskin area, the control unit may be configured to define the scanning order direction in dependence on a direction of flow of a gas stream directed across the raw material powder layer. In particular, the scanning order direction may be defined so as to comprise a component which is oriented opposite to the direction of flow of the gas stream directed across the raw material powder layer.

For an irradiation section which contains a downskin area, the control unit may be configured to define the scanning order direction such that an angle between the scanning order direction and a part growth direction is 90°.

The control unit may further be configured to determine, for a first edge scanning vector within a downskin area of an irradiation section, a number of endpoints of the first edge scanning vector which are in contact with an on-solid area or lie on an on-solid area, and to determine, for a second edge scanning vector within the downskin area, a number of endpoints of the second edge scanning vector which are in contact with an on-solid area or lie on an on-solid area. The control unit may further be configured to define the scanning order direction such that the one of the first and the second edge scanning vector which has more endpoints in contact with the on-solid area or lying on the on-solid area is defined as a starting scanning vector and/or such that the one of the first and the second edge scanning vector which has less endpoints in contact with the on-solid area or lying on the on-solid area is defined as a final scanning vector.

If it is determined, for a first and a second edge scanning vector within a downskin area of an irradiation section, that none of the first and the second edge scanning vector has an endpoint in contact with an on-solid area, the control unit may further be configured to determine, for the first edge scanning vector, a number of on-solid scanning vector points in a vicinity of the endpoints of the first edge scanning vector and to determine, for the second edge scanning vector, a number of on-solid scanning vector points in a vicinity of the endpoints of the second edge scanning vector. The control unit may further be configured to define the scanning order direction such that the one of the first and the second edge scanning vector which has more on-solid scanning vector points in the vicinity of its endpoints is defined as a starting scanning vector and/or such that the one of the first and the second edge scanning vector which has less on-solid scanning vector points in the vicinity of its endpoints is defined as a final scanning vector.

If it is determined, for a first and a second edge scanning vector within a downskin area of an irradiation section which also comprises an on-solid area, that none of the first and the second edge scanning vector has an endpoint in contact with the on-solid area, the control unit may further be configured to divide the irradiation section in the on-solid area into a first partial irradiation section and a second partial irradiation section. The control unit may further be configured to define, for the first partial irradiation section, a first scanning order direction which points from an on-solid area of the first partial irradiation section in a direction of a downskin area of the first partial irradiation section and to define, for the second partial irradiation section, a second scanning order direction which points from an on-solid area of the second partial irradiation section in a direction of a downskin area of the second partial irradiation section. The first scanning order direction and the second scanning order direction may point in opposite directions.

The scanning vectors may be unidirectionally oriented so as to point from an on-solid area in a direction of the downskin area.

For at least one raw material powder layer to be irradiated, the control unit may be configured to define an irradiation order direction according to which the irradiation sections within the raw material powder layer are scanned one after another so as to point from a first irradiation section in a direction of a second irradiation section, wherein the second irradiation section has a downskin area coverage that is larger than a downskin area coverage of the first irradiation section.

A computer program product comprises program portions for performing the method as outlined according to any one or more of the example implementations as described throughout the present disclosure when the computer program product is executed on one or more computing devices.

An apparatus for producing a three-dimensional work piece by irradiating layers of a raw material powder with a radiation beam comprises an above-described irradiation system according and/or a computer-readable recording medium on which the above-described computer program product is stored.

Preferred embodiments of the invention will be described in greater detail with reference to the appended schematic drawings, wherein FIG. 1 shows an apparatus for producing a three-dimensional work piece by irradiating layers of a raw material powder with a radiation beam;

Figure 6:
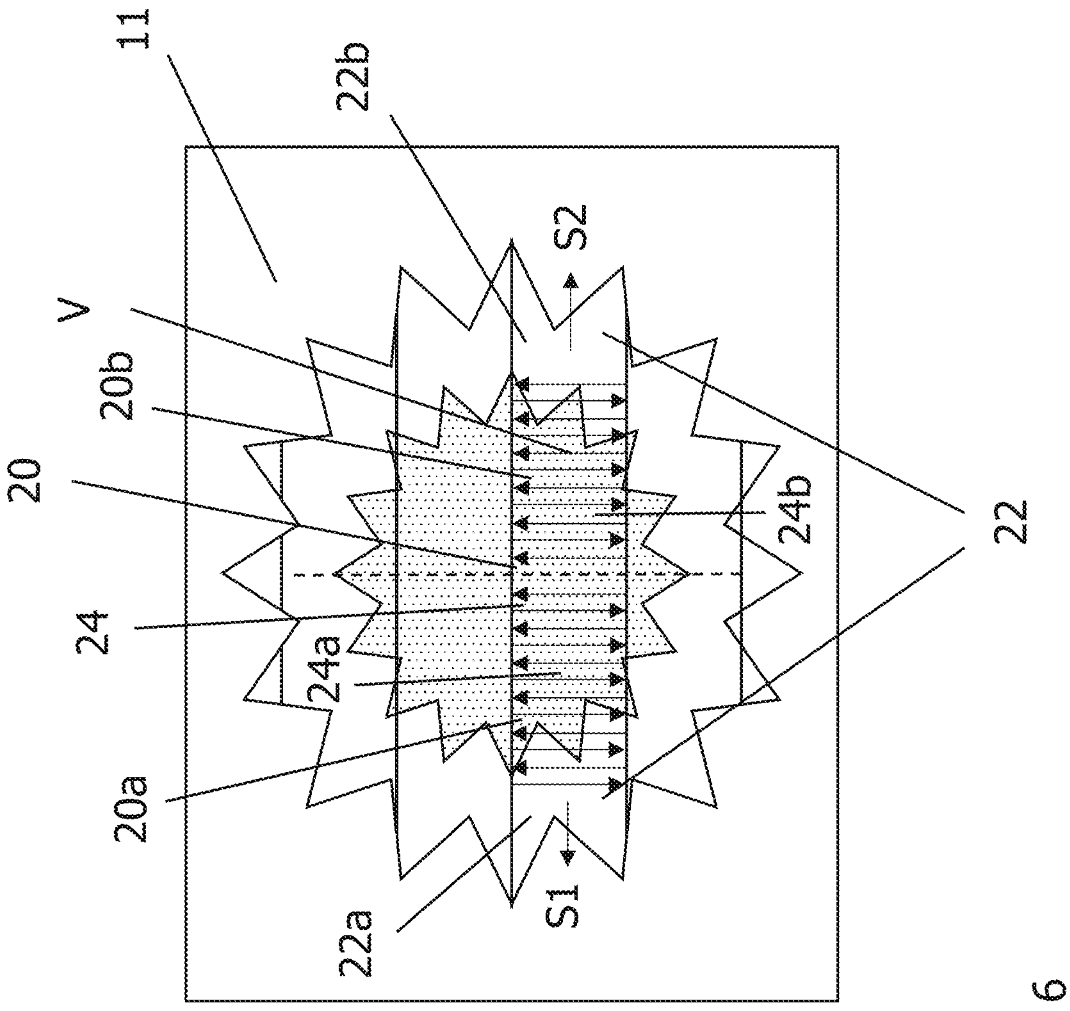
Figure 7:
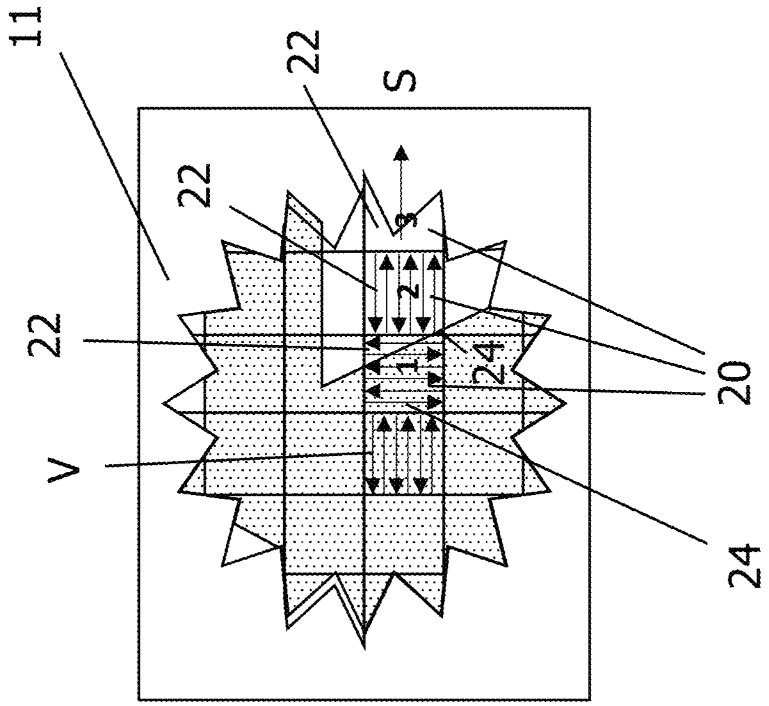

FIGS. 4*a* to *c* show the definition of a scanning order direction in dependence on a determination of the number of endpoints of a first and a second edge scanning vector within an exemplary downskin area which are in contact with an on-solid area;

FIGS. 5*a* to *d* show the definition of a scanning order direction in dependence on a determination of the number of endpoints of a first and a second edge scanning vector within further exemplary downskin areas which are in contact with an on-solid area;

FIG. 6 show the definition of a scanning order for an irradiation section which comprises a downskin area and an on-solid area and wherein none of a first and a second edge scanning vector has an endpoint in contact with the on-solid area; and FIG. 7 shows the definition of an irradiation order direction for irradiation sections of a chess scanning pattern so as to point from a first irradiation section in a direction of a second irradiation section which contains a downskin area that is larger than a downskin area of the first irradiation section.

Figure 1:
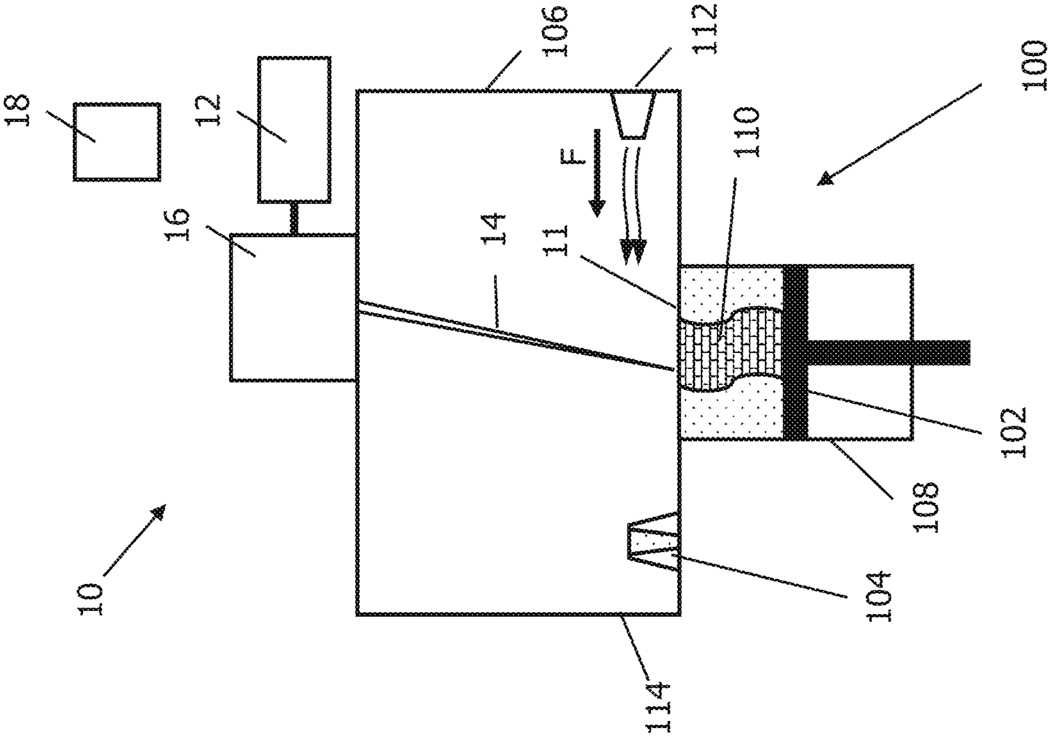

FIG. 1 shows an apparatus 100 for producing a three-dimensional work piece by an additive manufacturing process. The apparatus 100 comprises a carrier 102 and a powder application device 104 for applying a raw material powder onto the carrier 102. The carrier 102 and the powder application device 104 are accommodated within a process chamber 106 which is sealable against the ambient atmosphere. The carrier 102 is displaceable in a vertical direction into a built cylinder 108 so that the carrier 102 can be moved downwards with increasing construction height of a work piece 110, as it is built up in layers from the raw material powder on the carrier 12. The carrier 102 may comprise a heater and/or a cooler.

The apparatus 100 further comprises an irradiation system 10 for selectively irradiating laser radiation onto the raw material powder layer 11 applied onto the carrier 102. In the embodiment of an apparatus 100 shown in FIG. 1, the irradiation system 10 comprises a radiation beam source 12 which is configured to emit a radiation beam 14. The radiation beam source 12 may be a laser beam source which is configured to emit a laser beam. An optical unit 16 for guiding and processing the radiation beam 14 emitted by the radiation beam source 12 is associated with the radiation beam source 12. It is, however, also conceivable that the irradiation system 10 is configured to emit two or more radiation beams. A control device 18 is provided for controlling the operation of the irradiation system 10 and further components of the apparatus 100 such as, for example, the powder application device 104. The control unit 18 comprises a computer-readable recording medium on which a computer program product comprising program code portions is stored.

A controlled gas atmosphere, preferably an inert gas atmosphere is established within the process chamber 106 by supplying a shielding gas to the process chamber 106 via a process gas inlet 112. After being directed through the process chamber 106 and across the raw material powder layer 11 applied onto the carrier 102, the gas is discharged from the process chamber 106 via a process gas outlet 114. The flow direction of the shielding gas from the process gas inlet 112 through the process chamber 106 to the gas process gas outlet 114 is indicated with the arrow F. The process gas may be recirculated from the process gas outlet 114 to the process gas inlet 112 and thereupon may be cooled or heated.

During operation of the apparatus 100 for producing a three-dimensional work piece, a layer 11 of raw material powder is applied onto the carrier 102 by means of the powder application device 104. In order to apply the raw material powder layer 11, the powder application device 104 is moved across the carrier 102 under the control of the control unit 18. Then, again under the control of the control unit 18, the layer 11 of raw material powder is selectively irradiated in accordance with a geometry of a corresponding layer of the work piece 110 to be produced by means of the irradiation device 10. The steps of applying a layer 11 of raw material powder onto the carrier 102 and selectively irradiating the layer 11 of raw material powder with laser radiation in accordance with a geometry of a corresponding layer of the work piece 110 to be produced are repeated until the work piece 110 has reached the desired shape and size.

Figure 2:
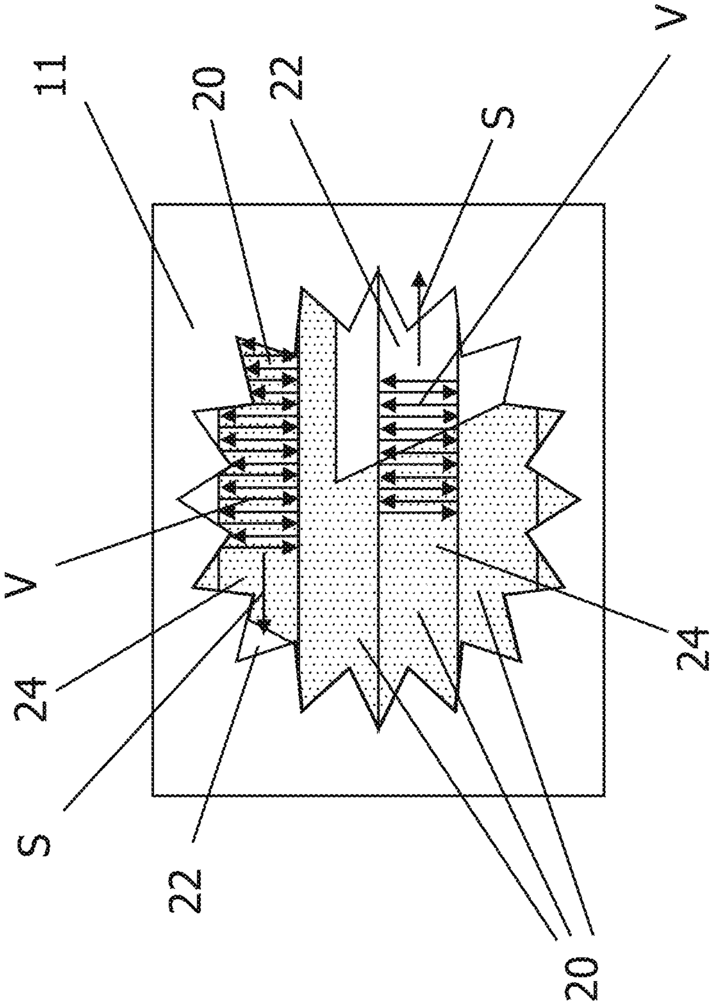
FIG. 2 shows the definition of a scanning order direction for irradiation sections of a stripe scanning pattern so as to point from an on-solid area in a direction of a downskin area.
Figure 4:
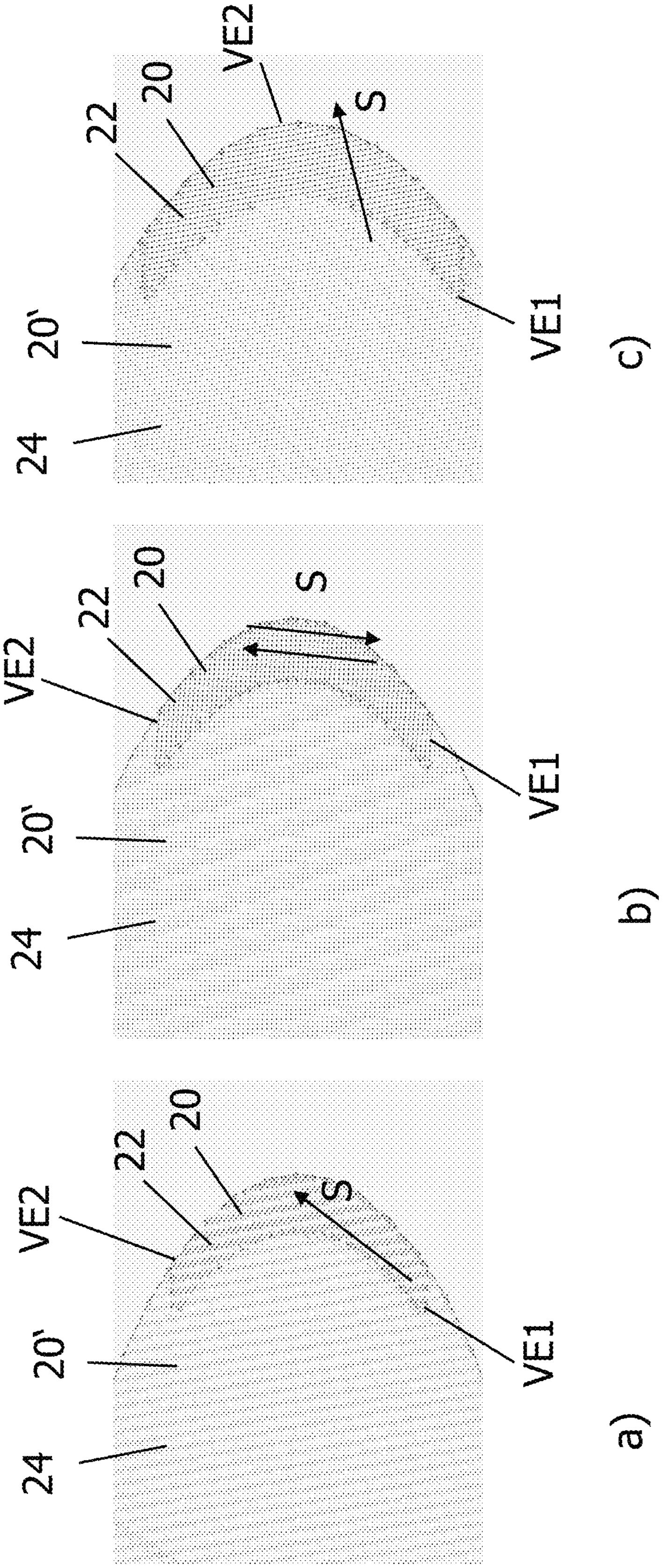
Figure 5:
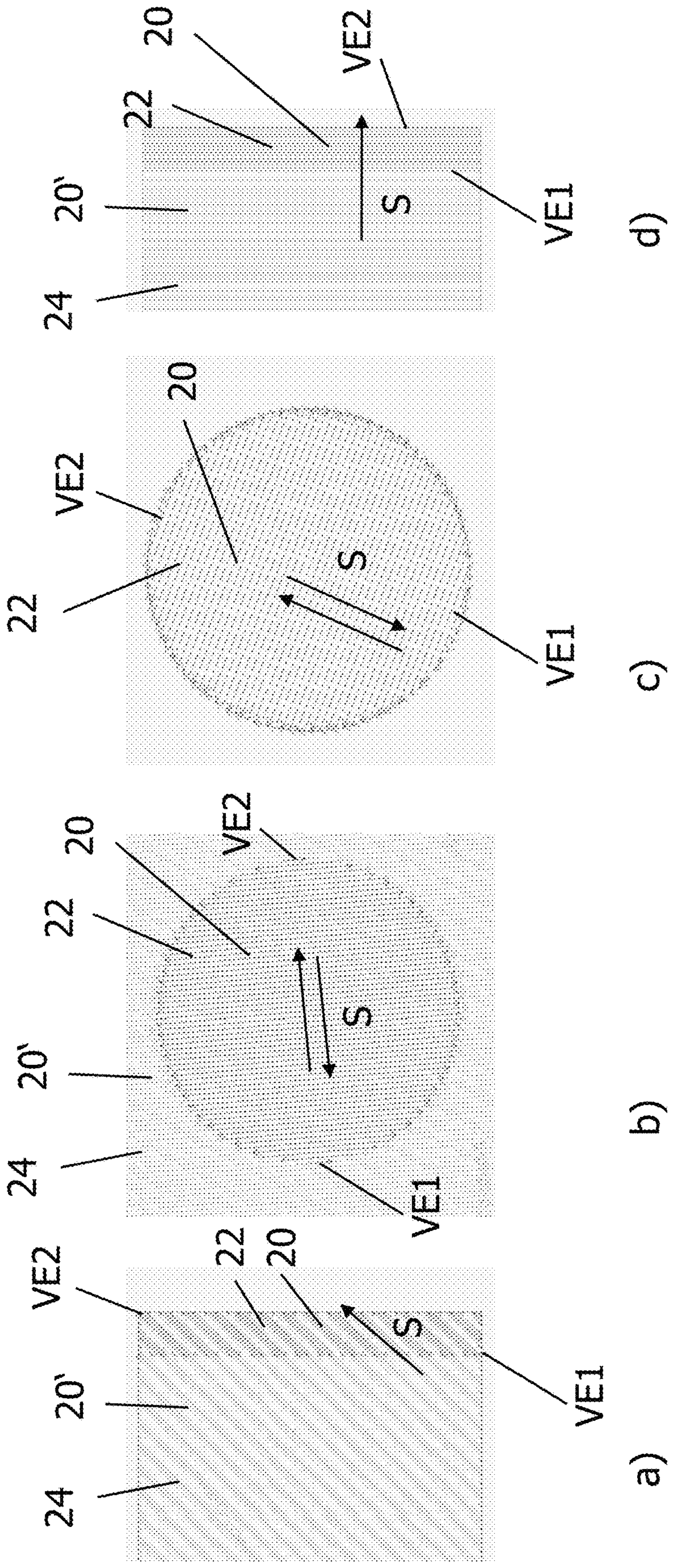

The radiation beam 14 is scanned across the raw material powder layer 11 according to a scanning pattern which is defined by the control unit 18. The scanning pattern may be a stripe pattern is shown in FIGS. 2 and 6, a chess pattern as shown in FIG. 7 or another suitable scanning pattern as shown in FIGS. 4 and 5 and comprises a plurality of irradiation sections 20, wherein blocks of scanning vectors V are arranged. Typically and as shown in FIGS. 2 to 7, the scanning vectors V extend substantially parallel to each other. The control unit 18 determines for each of the plurality of irradiation sections 20, whether the irradiation section 20 contains a downskin area 22, i.e. an area which lies above unsolidified powder and which is intended to form an overhang area of the work piece layer to be produced by irradiating the raw material powder layer 11.

Based on said determination, the control unit 18 defines, for each of the plurality of irradiation sections 20, a scanning order direction S according to which the scanning vectors V within the irradiation section 20, in particular adjacent scanning vectors V within the irradiation section 20, are scanned one after another in dependence on the determination of whether the irradiation section 20 contains a downskin area 22. In the exemplary arrangements shown in FIGS. 2 to 7, the scanning order direction S extends substantially perpendicular to the scanning vectors V within the irradiation section. Specifically, for an irradiation section 20 which contains a downskin area 22, the scanning order direction S preferably is defined so as to point from an on-solid area 24 in a direction of the downskin area 22.

FIG. 2 shows a raw material powder layer 11 which is intended to form a work piece layer comprising an overhang area. The scanning pattern according to which the radiation beam 14 should be scanned across the raw material powder layer 11 is a stripe pattern and thus comprises a plurality of stripe-shaped irradiation sections 20. The scanning vectors V within each of the plurality of irradiation sections 20 extend substantially parallel to each other and substantially perpendicular to a longitudinal axis of the stripe-shaped irradiation section 20. Adjacent scanning vectors V point in opposite directions. Although all irradiation sections 20 are covered with scanning vectors V in an area wide manner, for the sake of clarity, the schematic representation of FIG. 2, shows scanning vectors V in only portions of selected irradiation sections 20.

Downskin areas 22 of the irradiation sections 20, which are intended to form overhang areas of the work piece layer to be produced by irradiating the raw material powder layer 11, are built on unsolidified portions of a previously applied raw material powder layer. To the contrary, on-solid areas 24 of the irradiation sections 20, which are intended to form volume areas of the work piece layer to be produced by irradiating the raw material powder layer 11, are built on solidified portions of a previously applied raw material powder layer, i.e. on portions of a previously built work piece layer.

The scanning order direction S is defined so as to follow the general rule "from solid to powder", i.e. is defined, for each irradiation section 20 which comprises a downskin area 22 and an on-solid area 24, so as to point from the on-solid area 24 in a direction of the downskin area 22. A vector defining the scanning order direction S thus comprises a starting point which is located in the on-solid area 24 and an endpoint which is located in the downskin area 22. Thus, for the irradiation section 20 depicted in the upper part of FIG. 2, a scanning order direction S pointing to the left in FIG. 2 is defined, whereas, for the irradiation section 20 depicted in the lower part of FIG. 2, a scanning order direction S pointing to the right in FIG. 2 is defined.

For an irradiation section 20 which does not contain a downskin 22 area, the scanning order direction S may be defined so as to point from the on-solid area 24 in a direction of a downskin area 22 of a further, for example adjacent, irradiation section 20. It is, however, also conceivable that for an irradiation section 20 which does not contain a downskin area 22, the scanning order direction S is defined in dependence on the direction of flow F of the gas stream directed through the process chamber 106 and across the raw material powder layer 11. Specifically, the scanning order direction S may be defined so as to comprise a component which is oriented opposite to the direction of flow F of the gas stream.

Figure 3:
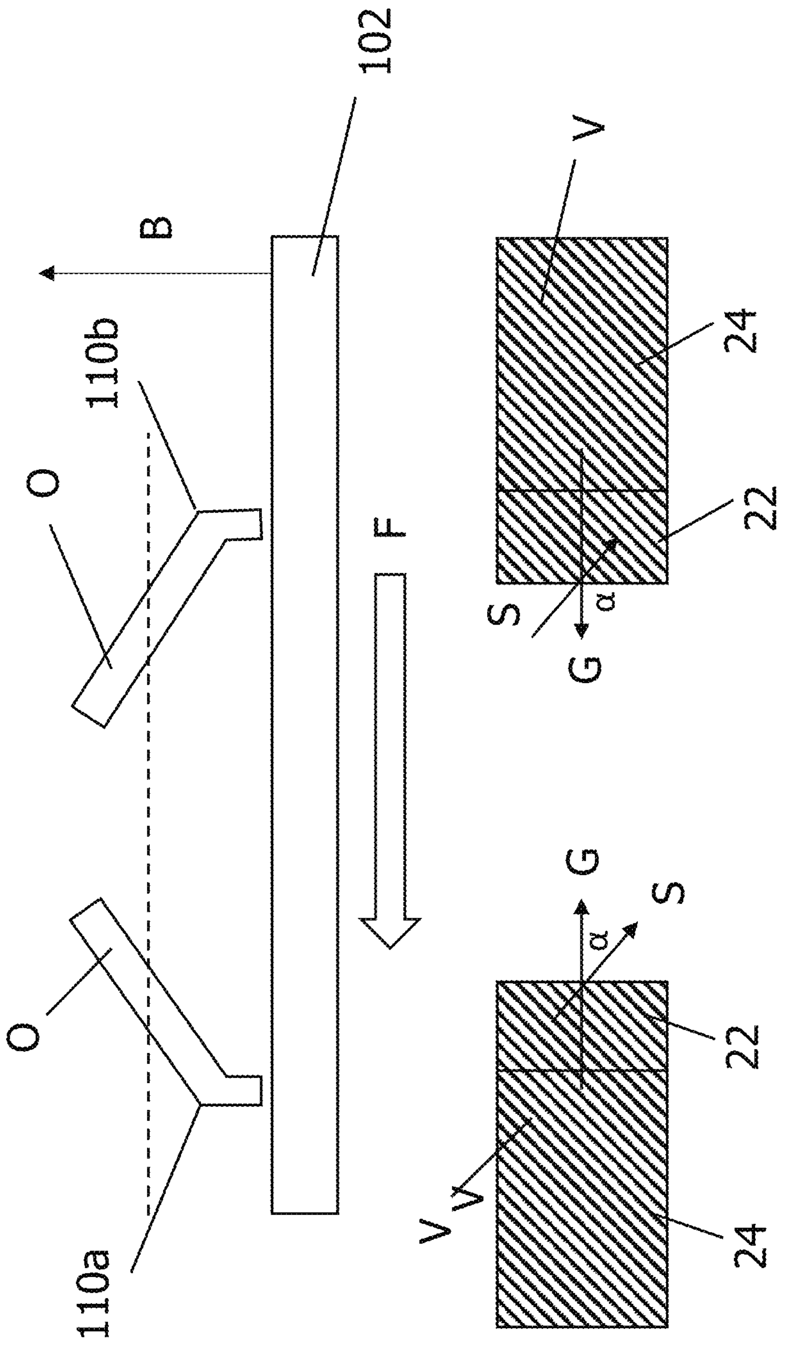
FIG. 3 shows the definition of a scanning order direction in dependence on a part growth direction for two exemplary work pieces with an overhang region.

FIG. 3 shows a further example for defining the scanning order direction S so as to follow the general rule "from solid to powder". FIG. 2 shows two work pieces 110*a*, 110*b* which are built up on a carrier 102. A built direction is indicated by the arrow B. Each of the work pieces 110*a*, 110*b* comprises an overhang region O. The lower part of FIG. 3 shows irradiation sections 20 of a raw material powder layer 11 which is irradiated by the radiation beam 14 so as to produce the layer of the work pieces 110*a*, 110*b* which is indicated by the dashed line in the upper part of FIG. 3. Each of the irradiation sections 20 comprises a downskin area 22 and an on-solid area 24.

Arrows G indicate a part growth direction of the work piece layers to be produced "from solid to powder". For each of the irradiation sections 20, the part growth direction G extends from the on-solid area 24 towards the downskin area 22. FIG. 3 shows a case wherein the same scanning order direction S, which comprises a component which is oriented opposite to the direction of flow F of the gas stream, is defined for both irradiation sections 20. For the work piece 110*a* on the left side of FIG. 3, the scanning order direction S is defined such that an angle α between the scanning order direction S and the part growth direction G is approximately 45° and hence <90°. Consequently, a vector defining the scanning order direction S has a component which extends the same direction as the part growth direction G. As a result, the scanning order direction G points from the on-solid area 24 in the direction of the downskin area 22. It is thus to be expected that the work piece 110*a* fulfills high quality standards.

To the contrary, for the work piece 110*b* on the right side of FIG. 3, the scanning order direction S is defined such that an angle α between the scanning order direction S and the part growth direction G is approximately 135° and hence >90°. Consequently, a vector defining the scanning order direction S does not have a component which extends in the same direction as the part growth direction G. As a result, the scanning order direction G points from the downskin area 22 in the direction of the on-solid area 24. It might thus be expected that the work piece 110*b* suffers from quality deficiencies. To avoid this, the scanning order direction S should be redirected, i.e. rotated by 180°.

FIGS. 4 and 5 show various exemplary irradiation sections 20 which consist exclusively of a downskin area 22, i.e. which do not comprise an on-solid area 24. While the irradiation sections 20 shown in FIGS. 4*a* to *c* and FIGS. 5*a*, *b* and *d* are arranged adjacent to an on-solid area 24 of a neighboring irradiation section 20', the irradiation section 20 shown in figure c is not in contact with an on-solid area of a neighboring irradiation section.

In the following, an exemplary strategy for determining a suitable scanning order direction S for the exclusively downskin irradiation sections 20 shown in FIGS. 4 and 5 will be described. Said strategy may, however, also be applied for irradiation sections 20 which comprise both a downskin area 22 and an on-solid area 24, such as, for example, the irradiation sections shown in FIG. 2.

Said strategy involves determining, for a first edge scanning vector VE1 within a downskin area 22 of an irradiation section 20, a number of endpoints of the first edge scanning vector VE1 which are in contact with an on-solid area 24 of the same or an adjacent irradiation section 20. Further, for a second edge scanning vector VE2 within the downskin area 22, a number of endpoints of the second edge scanning vector VE2 which are in contact with an on-solid area 24 of the same or an adjacent irradiation section 20 of the same or an adjacent irradiation section 20 is be determined. The edge scanning vectors VE1, VE2 define opposing edges of the downskin area 22 of the irradiation section 20. The scanning order direction S is defined such that the one of the first or the second edge scanning vector VE1, VE2 which has more endpoints in contact with the on-solid area 24 is defined as a starting scanning vector and/or such that the one of the first and the second edge scanning vector VE1, VE2 which has less endpoints in contact with the on-solid area 24 is defined as a final scanning vector.

In the arrangement of FIG. 4*a*, the first edge scanning vector VE1 has two endpoints in contact with the on-solid area 24 of the adjacent irradiation section 20'. The second edge scanning vector VE2 has only one end point in contact with the on-solid area 24 of the adjacent irradiation section 20'. Consequently, the scanning order direction S is defined such that the first scanning vector VE1 is defined as a starting scanning vector, while the second scanning vector VE2 is defined as a final scanning vector.

In the arrangement of FIG. 4*b*, each of the first and the second edge scanning vector VE1, VE2 has one endpoints in contact with the on-solid area 24 of the adjacent irradiation section 20'. Consequently, the scanning order direction S may be defined such that any one of the first scanning vector VE1, VE2 is defined as a starting scanning vector.

In the arrangement of FIG. 4*c*, the first edge scanning vector VE1 has two endpoints in contact with the on-solid area 24 of the adjacent irradiation section 20'. The contrary, none of the endpoints of the second edge scanning vector VE2 is in contact with the on-solid area 24 of the adjacent irradiation section 20'.

Consequently, the scanning order direction S is defined such that the first scanning vector VE1 is defined as a starting scanning vector, while the second scanning vector VE2 is defined as a final scanning vector.

In the arrangement of FIG. 5*a*, the first edge scanning vector VE1 has one endpoint in contact with the on-solid area 24 of the adjacent irradiation section 20', while none of the endpoints of the second edge scanning vector VE2 is in contact with the on-solid area 24 of the adjacent irradiation section 20'. Consequently, the scanning order direction S is defined such that the first scanning vector VE1 is defined as a starting scanning vector, while the second scanning vector VE2 is defined as a final scanning vector.

In the arrangement of FIG. 5*b*, each of the first and the second edge scanning vector VE1, VE2 has two endpoints in contact with the on-solid area 24 of the adjacent irradiation section 20'. Consequently, the scanning order direction S may be defined such that any one of the first scanning vector VE1, VE2 is defined as a starting scanning vector.

In both of the arrangements of FIGS. 5*c* and 5*d*, none of the first and the second edge scanning vector VE1, VE2 has any endpoint in contact with the on-solid area 24 of the adjacent irradiation section 20'. Basically, the scanning order direction S thus may be defined such that any one of the first scanning vector VE1, VE2 is defined as a starting scanning vector.

In the arrangement of FIG. 5*d*, an additional determination step therefore is used to determine, for the first edge scanning vector VE1, a number of on-solid scanning vector points in a vicinity of the endpoints of the first edge scanning vector VE1 and, for the second edge scanning vector VE2, a number of on-solid scanning vector points in a vicinity of the endpoints of the second edge scanning vector VE2. For example, an area having a specific radius of, for example, 0.25 mm may be defined around the endpoints of the first and the second edge scanning vectors VE1, VE2 and it may be determined how many on-solid scanning vector points are arranged in said area. Based on this additional determination step, the first scanning vector VE1 is defined as a starting scanning vector, while the second scanning vector VE2 is defined as a final scanning vector.

FIG. 6 shows a further exemplary raw material powder layer 11 which is intended to form a work piece layer comprising an overhang area. Like in the arrangement of FIG. 2, the scanning pattern according to which the radiation beam 14 should be scanned across the raw material powder layer 11 is a stripe pattern comprising a plurality of stripe-shaped irradiation sections 20. The irradiation section 20 which in FIG. 6 is illustrated so as to comprise a plurality of substantially parallel scanning vectors V comprises a downskin area 22 and an on-solid area 24.

In the step of analysing, how many endpoints of a first and a second edge scanning vector VE1, VE2 are in contact with the on-solid area 24 of the irradiation section 20 it is determined that none of the first and the second edge scanning vector VE1, VE2 has an endpoint in contact with the on-solid area 24. Therefore, the irradiation section 20 is divided in the on-solid area 24 along the dashed line into a first partial irradiation section 20*a* and a second partial irradiation section 20*b*. Thus, each of the first and the second partial irradiation section 20*a*, 20*b* comprises an on-solid area 24*a* defined by a part of the on-solid area 24 of the undivided irradiation section 20 and a downskin area 22*a* defined by a part of the downskin area 22 of the undivided irradiation section 20.

For the first partial irradiation section 20*a*, a first scanning order direction S1 which points from the on-solid area 24*a* of the first partial irradiation section 22*a* in a direction of the downskin area 24*a* of the first partial irradiation section 22*a*, i.e. to the left in FIG. 6, is defined. For the second partial irradiation section 22*b*, a second scanning order direction S2 which points from the on-solid area 24*b* of the second partial irradiation section 22*b* in a direction of the downskin area of 24*b* the second partial irradiation section 22*b*, i.e. to the right in FIG. 6, may be defined. The first scanning order direction S1 and the second scanning order direction S2 point in opposite directions.

In the exemplary arrangements shown in FIGS. 2 to 7, adjacent scanning vectors V point in opposite directions. It is, however, also conceivable provide for an unidirectional orientation of the scanning vectors V so as to point from an on-solid area 24 in a direction of the downskin area 22. The on solid area 24 may form a part of the irradiation section 20 which also comprises the downskin area 22 or may be part of an adjacent irradiation section 20. For example, in the arrangement of FIG. 5*d*, the scanning vectors V may be reoriented so as to unidirectionally point from the on-solid area 24 of the irradiation section 20' in the direction of the downskin area 22 of the irradiation section 20.

FIG. 7 shows a further exemplary raw material powder layer 11 which is intended to form a work piece layer comprising an overhang area. The scanning pattern according to which the radiation beam 14 should be scanned across the raw material powder layer 11 is a chess pattern and thus comprises a plurality of rectangular-shaped irradiation sections 20. The scanning vectors V within each of the plurality of irradiation sections 20 extend substantially parallel to each other. Adjacent scanning vectors V point in opposite directions.

An irradiation order direction I according to which the irradiation sections 20 within the raw material powder layer 11 are irradiated one after another is defined so as to point from a first irradiation section 20 which is indicated with the numeral 1 in FIG. 7 in a direction of a second irradiation section 20 which is indicated with the numeral 2 in FIG. 7 and further in a direction of a third irradiation section 20 which is indicated with the numeral 3 in FIG. 7.

The second irradiation section 20 has a downskin area coverage (approximately 90%) that is larger than a downskin area coverage (approximately 20%) of the first irradiation section 20. Further, the third irradiation section 20 has a downskin area coverage (100%) that is larger than a downskin area coverage (approximately 90%) of the second irradiation section 20 Thus, also the irradiation order direction I according to which the irradiation sections 20 are irradiated one after another is defined so as to follow the rule "from solid to powder".

The invention claimed is:

1. Method of controlling an irradiation system for irradiating layers of a raw material powder with a radiation beam in order to produce a three-dimensional work piece, the method comprising:

defining, for at least one raw material powder layer to be irradiated, a scanning pattern comprising a plurality of irradiation sections, wherein, within each of the plurality of irradiation sections, a plurality of scanning vectors is defined, according to which the radiation beam is scanned across the at least one raw material powder layer;

defining, for each irradiation section of the plurality of irradiation sections, a scanning order direction according to which the plurality of scanning vectors within the irradiation section is scanned one after another, wherein, for at least one irradiation section which contains a downskin area, the scanning order direction is defined so as to point from an on-solid area in a direction of the downskin area.

2. The method according to claim 1, wherein, for at least one irradiation section which does not contain a downskin area, the scanning order direction is defined in dependence on a direction of flow of a gas stream directed across the at least one raw material powder layer, wherein the scanning order direction in particular is defined so as to comprise a component which is oriented opposite to the direction of flow of the gas stream directed across the at least one raw material powder layer.

3. The method according to claim 1, wherein, for at least one irradiation section which contains a downskin area, the scanning order direction is defined such that an angle ($\alpha$) between the scanning order direction and a part growth direction is $\leq 90°$.

4. The method according to claim 1, further comprising:

determining, for a first edge scanning vector within a downskin area of an irradiation section, a number of endpoints of the first edge scanning vector which are in contact with an on-solid area or lie on an on-solid area;

determining, for a second edge scanning vector within the downskin area, a number of endpoints of the second edge scanning vector which are in contact with an on-solid area or lie on an on-solid area; and defining the scanning order direction such that the one of the first and the second edge scanning vector which has more endpoints in contact with the on-solid area or lying on the on-solid area is defined as a starting scanning vector and/or such that the one of the first and the second edge scanning vector which has less endpoints in contact with the on-solid area or lying on the on-solid area is defined as a final scanning vector.

5. The method according to claim 1, wherein, if it is determined, for a first and a second edge scanning vector within a downskin area of an irradiation section, that none of the first and the second edge scanning vector has an endpoint in contact with an on-solid area, the method further comprises:

determining, for the first edge scanning vector, a number of on-solid scanning vector points in a vicinity of the endpoints of the first edge scanning vector;

determining, for the second edge scanning vector, a number of on-solid scanning vector points in a vicinity of the endpoints of the second edge scanning vector; and defining the scanning order direction such that the one of the first and the second edge scanning vector which has more on-solid scanning vector points in the vicinity of its endpoints is defined as a starting scanning vector and/or such that the one of the first and the second edge scanning vector which has less on-solid scanning vector points in the vicinity of its endpoints is defined as a final scanning vector.

6. The method according to claim 1, wherein, if it is determined, for a first and a second edge scanning vector within a downskin area of an irradiation section which also comprises an on-solid area, that none of the first and the second edge scanning vector has an endpoint in contact with the on-solid area, the method further comprises:

dividing the irradiation section in the on-solid area into a first partial irradiation section and a second partial irradiation section;

defining, for the first partial irradiation section, a first scanning order direction which points from an on-solid area of the first partial irradiation section in a direction of a downskin area of the first partial irradiation section; and defining, for the second partial irradiation section, a second scanning order direction which points from an on-solid area of the second partial irradiation section in a direction of a downskin area of the second partial irradiation section, wherein the first scanning order direction and the second scanning order direction in particular point in opposite directions.

7. The method according to claim 1, wherein the plurality of scanning vectors is unidirectionally oriented so as to point from an on-solid area in a direction of the downskin area.

8. The method according to claim 1, wherein, for at least one raw material powder layer to be irradiated, an irradiation order direction (I) according to which the plurality of irradiation sections within the at least one raw material powder layer is irradiated one after another is defined so as to point from a first irradiation section in a direction of a second irradiation section, wherein the second irradiation section has a downskin area coverage that is larger than a downskin area coverage of the first irradiation section.

* * * * *